Nov. 22, 1960    J. V. PETRIELLO    2,961,345
COMPOSITE PLASTIC FILM AND A METHOD OF MAKING
THE SAME IN CONTINUOUS FORM
Filed Aug. 5, 1957    2 Sheets-Sheet 2
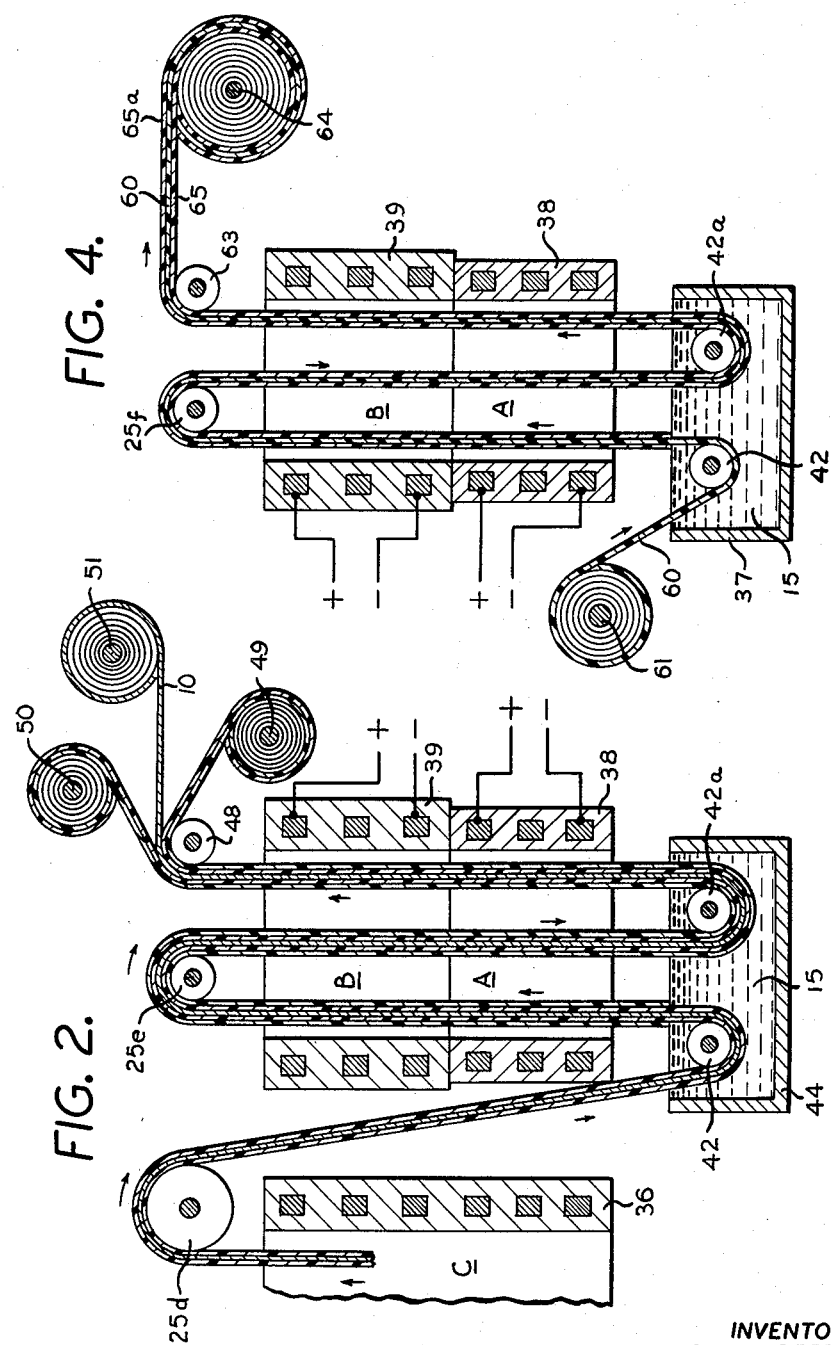
INVENTOR
JOHN V. PETRIELLO
BY
ATTORNEY.

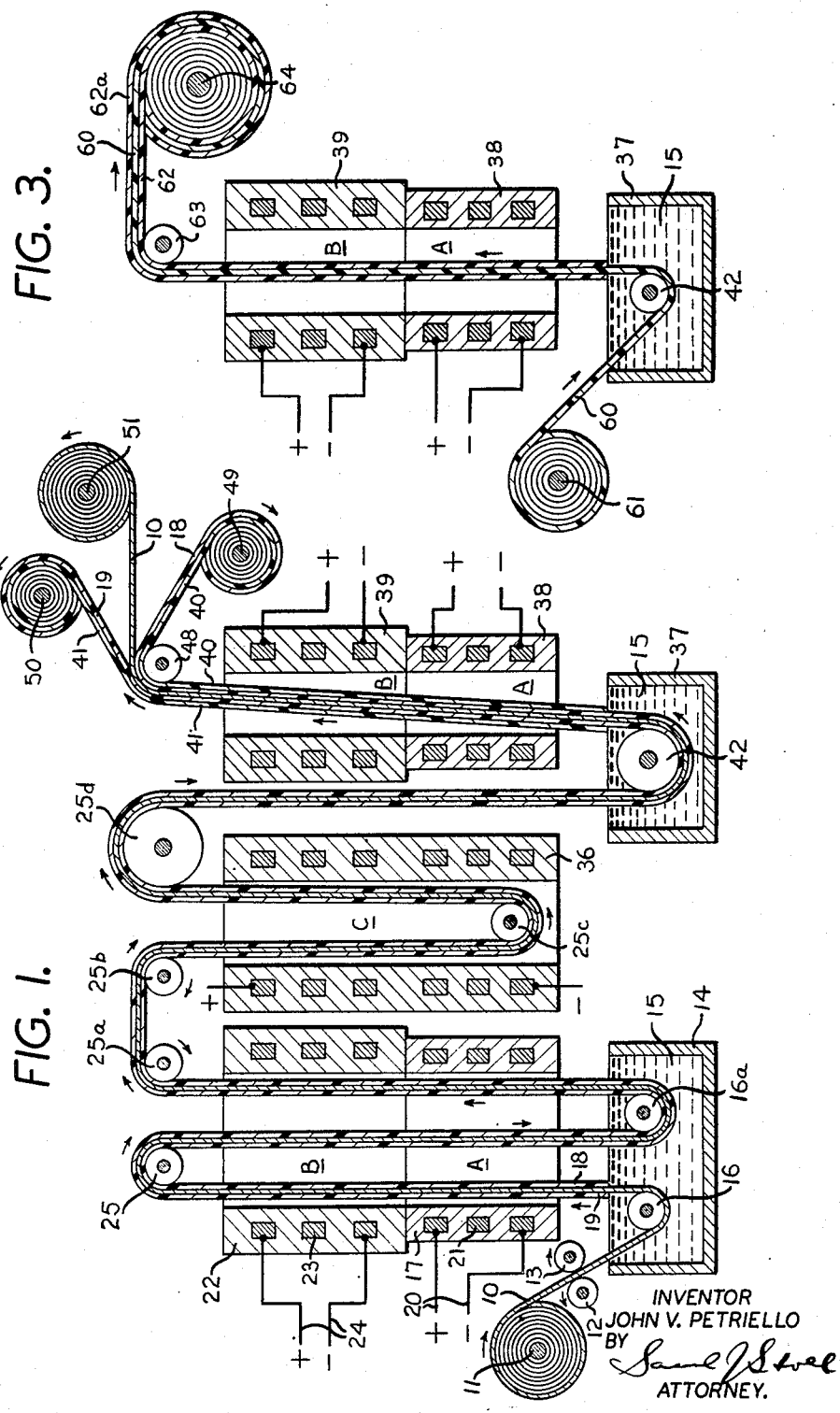

United States Patent Office 2,961,345
Patented Nov. 22, 1960

2,961,345

COMPOSITE PLASTIC FILM AND A METHOD OF MAKING THE SAME IN CONTINUOUS FORM

John V. Petriello, 92—12 213th St., Queens Village, N.Y.

Filed Aug. 5, 1957, Ser. No. 676,247

1 Claim. (Cl. 117—138.8)

This invention relates to a composite plastic film and a method of making the same in continuous form.

This invention constitutes a development of the subject matter of my co-pending patent application Serial No. 413,024 filed March 1, 1954 now U.S. Patent No. 2,852,811 on a method and apparatus for casting thin plastic films. The present application is therefore a continuation-in-part of said copending patent application.

The principal object of this invention is the provision of a process for producing composite laminates of fused and non-fused or partially fused plastic films and the invention is also directed to the work products of said process.

The invention relates to many kinds of plastic materials, including polytetrahaloethylene and especially polytetrafluoroethylene. For purposes of illustration, however, the invention will be described solely in connection with the use of polytetrafluoroethylene, but this should not be deemed a limitation of the scope, use or application of the invention.

One object of the invention is to provide a composite film of polytetrafluoroethylene having at least one surface which would be amenable to fusion with like surfaces and other substrates. Another object is to provide a film capable of being fused to itself or to other surfaces to form a contiguous adherent structure. Still another object is to provide a composite film having a completely fused layer with a superimposed non-fused or partially fused layer. A further object is to provide a method and a means of preparing such composite structures in a continuous operation.

The method of this invention includes the formation of composite film upon a base of fused polytetrafluoroethylene to produce a permanently adherent surface film of non-fused polytetrafluoroethylene applied from an aqueous dispersion. The non-fused layer is made contiguous with the fused layer by a drying and baking operation similar in all but one respect, as hereinafter set forth, to that described in my said co-pending patent application.

The present method requires that the non-fused or partially fused layer be exposed to heat sufficient to evaporate the water of such dispersion, together with modificants such as dispersing agents, without reaching the crystalline transition temperature of polytetrafluoroethylene. More particularly, this composite film is produced by applying a surface coating from an aqueous dispersion of the character described, and then removing substantially all of the water and dispersing agent at temperatures between 150° C. and 320° C., which are well below the 327° C. crystalline transition temperature of polytetrafluoroethylene.

By reason of the foregoing, I have made available for the first time a composite structure that contains at least one outer layer having unique adherent and fusion properties with a base layer of supporting fused polytetrafluoroethylene. The unique feature of this invention is that the outer non-fused or partially fused layer can be made to seal or encapsulate objects such as metal surfaces, particularly wire and foil conductors of electric current. This invention is further unique in that the outer layer of non-fused or partially fused polytetrafluoroethylene is resistant to abrasion and cannot flake off the base layer by flexing or drawing.

This is a most unexpected and surprising feature since the residue of such dispersion is normally a fine powdered colloidal material or suspension. Furthermore, the present invention discloses valuable uses of the inherent coalescing property of the applied dispersion.

The invention is illustrated in the accompanying drawing in which:

Fig. 1 is a sectional view of apparatus adapted for use in connection with the present invention, said apparatus being adapted to produce a strippable composite film comprising a single non-fused or partially fused outer layer superimposed upon a base consisting of a fused layer.

Fig. 2 is a sectional view of modified apparatus which produces a strippable composite film comprising a layer consisting of a plurality of non-fused or partially fused layers superimposed upon a base layer which is completely fused.

Fig. 3 is a sectional view of a single stage apparatus for applying at least one non-fused or partially fused outer layer upon an unsupported fused base layer.

Fig. 4 is a sectional view through a multiple stage apparatus for applying a multiplicity of non-fused or partially fused layers upon an unsupported fused layer.

Fig. 1 shows an apparatus described as Fig. 4 in my said co-pending patent application, Serial No. 413,024, with the addition of container 37, drying oven 38 and baking oven 39. To complete the description of Fig. 1, the following elements are to be noted: A light gauge flexible belt 10 of the order of several inches in width or more and many feet in length, forty feet for example, is carried by a roller or reel 11 adjustably tensioned by appropriate friction means. This belt is made of relatively non-oxidizing metal which is relatively chemically inert in the presence of air and water, such as stainless steel. The belt is maintained in a very smooth condition with a surface roughness of less than 250 microinches by being led between buffing rollers 12 and 13 which continuously act upon it during the entire casting operation hereinafter described.

Belt 10 is then led into container 14 which contains an aqueous dispersion of polytetrafluoroethylene particles 15. The concentration of the dispersion depends on various factors, including the thickness of the film which is to be cast. For example, the polytetrafluoroethylene solids may comprise the following percentages of the dispersion: 30, 35, 40, 50 and 60. Specific illustrations are given in my said co-pending patent application and also hereinafter in the present specification.

A commercial grade of polytetrafluoroethylene may be used such as that sold under the trademark Teflon, made by E. I. du Pont de Nemours & Co., and containing 6% Triton x–100, which is a wetting, emulsifying and dispersing agent made by Rohm & Haas Co. The dispersion may be thickened by adding additional Triton x–100, which is a surface-active aryl-alkyl polyether, or supplemental amounts of emulsified resins such as polystyrene, copolymers of styrene with butadiene and acrylonitrile, polyisobutylene and polymethyl methacrylate. These resins may be added in latex form to the polytetrafluoroethylene dispersions in amounts from 1 to 20 parts by weight to form viscous slurries. It will be understood that during the sintering operation hereinafter described, these added resins serve to hold the polytetrafluoroethylene particles together. At the same time, the resins are gradually decomposed and volatilized leaving a clean film of polytetrafluoroethylene.

As has above been indicated, this invention is not limited to polytetrafluorothylene and it may be extended to other polytetrahaloethylenes such as polychlorotrifluoroethylene, as well as to other plastic materials. Illustrations are cellulose nitrate, cellulose acetate, cellulose ethers, cellulose mixed esters, nylon, polystyrene, polyethylene, vinyls, and rubber hydrochloride. The plastic material should either be in the form of colloidal particles dispersed in a suitable liquid medium, such as water, or the plastic material may be dissolved in a suitable liquid solvent. The polytetrahaloethylene dispersions are characterized by extremely small particle sizes appreciably less than 1 micron as described in Industrial and Engineering Chemistry, volume 44, pp. 1800–1805 (1952).

Returning to Fig. 1, it will be noted that belt 10 passes around an idler roller 16 in the aqueous dispersion 15 and it then emerges from said dispersion coated with wet layers 18 and 19 thereof. The belt is then moved into and through a drying oven 17 which is maintained at a temperature between 60° C. and 150° C. This is an electric drying oven having electrical heating elements 21 supplied with power from a suitable source through conductors 20.

The drying oven may be an electrically heated warm air type as shown or may be a gas fired oven or it may simply consist of a double bank of infrared lamps directing their rays on the passing belt. From the drying zone A the belt continues its upward movement into the sintering zone B of sintering oven 22. This oven is maintained at a temperature varying from about 290° C. at the entrance to zone B to about 410° C. adjacent the exit from said zone. Sintering oven 22 may also be an electrically heated warm air oven heated by a series of electrical resistance elements 23 fed by conductors 24 from a suitable source of electric current.

It will now be noted that the belt 10 is subjected to at least two dips into container 14, the first dip being of the belt itself and all subsequent dips being of the layers formed on said belt in order to thicken said layers. Fig. 1 shows only two such dips but it will be understood that this is purely illustrative. Above oven 22 is an idler 25 around which the belt and its two layers 18 and 19 pass following the first dip and following the first trip through the oven. The belt and its said layers then pass downwardly through the oven and around another idler roller 16a which is disposed within the liquid contents 15 of container 14. This constitutes the second dip and the belt and its thickened layers now pass up through oven 22 in the same direction as in the first stage or cycle of the process. Above the oven is another idler roller 25a which carries the belt and its layers laterally away from oven 22.

It will now be noted that an additional oven 36 is provided to extend the baking or curing period. This additional baking is required if the aqueous dispersion 15 of polytetrafluoroethylene includes added wetting and thickening agents which may not be fully volatilized and driven off during the previous drying and sintering steps. This oven has a baking zone C which is maintained at a temperature of about 327° C. and provides a baking period of from 10 to 35 minutes or any other desired or required period of time. As shown in the drawing, belt 10 and its two films mounted thereon descend into oven 36 from idler roller 25b and they then pass around another idler roller 25c at the bottom of said oven and thence upwardly through the oven to an idler roller 25d. The two films are thereby carried twice through zone C of oven 36 but it will be understood that this is simply illustrative and if desired the films may be re-routed any number of times through said zone by simply adding idler rollers as illustrated in connection with oven 22.

When the residual wetting and thickening agents are fully baked out, the films strip easily from the belt.

By a succession of dips exceeding even the two dip process thus illustrated, films of increased thickness up to 0.003 inch or more are obtainable. This building-up of the thickness of the film by successive dips is found to result in a wholly homogeneous single layer film after the sintering is completed, and the film is not multi-layered or laminated as might be expected because of the sintering between successive dips. This fusion which takes place between the several coats of resin is complete and makes possible production of single layer homogeneous films of any desired or predetermined thickness.

Thus far the apparatus and process described correspond to the showing in Fig. 4 of my said co-pending patent application. What now follows is the improvement herein claimed.

Fused strippable films 18 and 19 are now fully prepared in accordance with the procedure laid down in my said co-pending application. They remain, however, mounted on the carrier belt 10 and said belt passes downwardly from idler roller 25d to another idler roller 42 in container 37 which contains an aqueous dispersion 15 of polytetrafluorothylene of a solids content of predetermined value. The belt and its sintered films 18 and 19 emerge from container 37 with wet layers 40 and 41 coating said films and they then enter oven 38 having a drying zone A. This drying zone is maintained at temperatures ranging from 150° C. to 250° C. The belt then continues into oven 39 having a baking zone B where the temperatures are maintained from 250° C. to 320° C. It must be noted that the temperature in oven 39 is never allowed to exceed the crystalline transition temperature of polytetrafluoroethylene which is 327° C.

On emerging from oven 39, the belt 10 carries a pair of films comprising the fully fused films 18 and 19 superimposed by layers 40 and 41 of non-fused or partially fused material. The composite films pass around idler 48, while they are still mounted on belt 10, and they are then stripped therefrom as Fig. 1 clearly shows. The composite film 18, 40 is taken up on roller 49, the composite film 19, 41 is taken up on roller 50, and the belt 10 is taken up on roller 51. This concludes the process of Fig. 1.

Fig. 2 shows an embodiment of the invention in which parts corresponding to Fig. 1 are correspondingly numbered. Belt 10 previously coated with fully fused strippable films 18 and 19 is subjected to at least two dips in container 44 containing the liquid dispersion 15. Said belt passes around roller 42 in said container and then up through drying zone A and baking zone B of ovens 38 and 39. These zones are maintained at temperatures corresponding to the temperatures of zones A and B in ovens 38 and 39 shown in Fig. 1. The belt then passes around another idler roller 25e above ovens 38 and 39 and it then travels downwardly through said ovens and around a second roller 42a in container 44. The belt then travel upwardly once again through ovens 38 and 39 and around roller 48.

Although two dips into the container are shown, it will be understood that this is merely illustrative and any number of dips may be provided in order to achieve desired thicknesses. The two dips produce superimposed non-fused or partially fused layers of greater thickness than is obtainable with a single dip as shown in Fig. 1. On each emersion from tank 44 the two fully fused films 18 and 19 pick up a layer of finely divided polytetrafluoroethylene in aqueous dispersion and these layers are multiplied by the number of such dips. As these layers pass through the drying zone A and baking zone B they are dried and baked into homogeneous single layers, one such layer on each of the two fused films 18 and 19. Since the temperature in these zones is maintained at all times below 327° C., these layers are never fully fused and they may either remain non-fused or only partially fused. As was shown in Fig. 1, each composite fused and non-fused or partially fused film is stripped from the supporting belt 10 and wound upon a receiving roller.

Fig. 3 shows apparatus for applying a non-fused or partially fused film over an unsupported fully fused polytetrafluorethylene film. A strip of unsupported film 60 from a roll 61 is passed into container 37 containing the aqueous dispersion 15 of polytetrafluoroethylene. The film passes around roller 42 in said aqueous dispersion and then emerges therefrom carrying on both sides a layer of finely divided polytetrafluoroethylene in aqueous dispersion. The film then enters drying zone A of oven 38 where temperatures ranging from 150° C. to 250° C. are maintained and it then passes through baking zone B of oven 39 maintained at temperatures ranging from 250° C. to 320° C. but never exceeding the crystalline transition temperature of this material which is 327° C. Upon leaving oven 39, the composite film now comprises a fused inner film 60 coated on both sides with non-fused or partially fused outer films 62 and 62a. The entire composite film passes around a roller 63 on leaving oven 39 and is taken up on a spool 64.

Fig. 4 shows a multi-stage apparatus wherein the unsupported fused film 60 may be subjected to two or more dips in dispersion 15. It will be noted that fused film 60 is drawn from roller 61 and that it passes around roller 42 through the dispersion 15. It then passes upwardly through the two ovens 38 and 39 and thence around idler roller 25f and back through the two ovens and again into said dispersion. It then passes around a second roller 42a in said dispersion and once again up through the two ovens 38 and 39. As has already been indicated, the fused film 60 would pick up coatings of the dispersion of greater thickness than could be obtained with a single dip. Since the temperatures in these ovens do not exceed the crystalline transition temperature of 327° C., these coatings remain either in a non-fused or partially fused condition. When the composite film finally emerges from the two ovens 38 and 39 in the final cycle thus described, it consists of the inner fused film 60 and the outer unfused or partially fused films 65 and 65a. The composite film passes around roller 63 and is taken up on spool 64.

It is important to follow the drying and baking procedure above described in connection with the non-fused or partially fused layers of polytetrafluoroethylene in order to produce the desirable results set forth in the preamble to this specification. If the outer coatings are not dried or baked in the manner set forth, they remain moist and sticky and are readily removed against rubbing surfaces. Furthermore, they have little moisture resistance and tend to be dislodged in the presence of water and other liquids.

Particular advantages of the composite films produced by the methods and procedures described herein may be illustrated by the following examples.

*Example I*

A 30 gauge U.S. Standard stainless steel belt (10) is passed through the dipping, drying and sintering arrangement in Figure 1 to produce the fused base and subsequently continued through a single stage dipping tank 37 whereby an outer coating is then applied. This coated film is then passed into the low temperature drying zone A of oven 38 maintained at a temperature between 150° C. and 250° C., and then through the baking zone B of oven 39 maintained at temperatures between 250° C. and 350° C., these latter temperatures being just below the fusion temperature of 327° C. for polytetrafluoroethylene but sufficiently high enough to cause strong adherence to the base film. The composite structure in this case comprises (a) a fused substrate of from 0.00025 to 0.005 inch in thickness depending upon the solids content and number of multiple dips into container 14 and subsequent drying and fusing stages employed as described in my said co-pending application Serial No. 413,024 filed March 1, 1954, and (b) an outcoating of 0.00025" to 0.001 inch thickness depending upon concentration of the dispersion in dip tank container 37.

By composite structure is meant a cross-section of the final product displays two distinct layers of polytetrafluoroethylene that differ in physical structure which renders the outer layer particularly useful for bonding wrap constructions. The composite product described herein has shown a hitherto unobserved property of fusing into a highly impermeable wrapping when applied as a ⅜ inch wide tape over an AWG-22 7 strand silver coated copper wire and the entire construction heated at temperatures over 327° C. to effect final fusion. The resulting insulated construction showed superior water-resistance when immersed for 72 hours, whereas a similar construction without the non-fused layer applied by this invention and fused in the same way showed leakage of water to the conductor in 20 minutes.

*Example II*

A 30 gauge U.S. Standard stainless steel belt (10) is passed through a dipping, drying and sintering arrangement shown in Figure 2 to produce a base of fused polytetrafluoroethylene and subsequently continued through multiple dips in container 44 whereby two or more outer coatings of dispersion are applied. The coated film is passed in two sequent series through the dip tank container 44 and the drying zone A of oven 47 maintained at temperatures between 150° C. and 250° C. and zone B of oven 47 maintained at temperatures between 250° C. and 350° C. which is just below the fusion temperature of 327° C. for polytetrafluoroethylene but sufficient to cause strong, non-flaking adherence to the base film. The resulting composite structure in this case comprises (a) a fused film substrate of from 0.00025" to 0.005" in thickness and (b) an outer coating of 0.0005" to 0.003" in thickness depending upon the concentration of dispersion employed in dip tank container 44.

A ⅜ inch wide tape wrapped as a double overlay at a 45 degree angle of approach over a ¼ inch O.D. steel mandrel for a length of 4 feet was fused by passing through an oven heated between 350° and 400° C. When cooled and removed from the mandrel this construction gave a uniformly fused tubing capable of withstanding a hydrostatic pressure of at least 80 lbs./sq. in. indefinitely without any signs of leakage. The superiority of this composite construction is demonstrated when a fully fused tape wrapping is applied and similarly fused by passing through an oven heated between 350° and 400° C., cooled and removed from the mandrel. Upon the application of a hydrostatic pressure of 25 lbs./sq. in. this tubing failed.

*Example III*

The applicability of this invention to unsupported film is further illustrated by subjecting (a) a fused cast tape, 0.002" thick by 8 inches wide and 100 ft. length and (b) a skived tape of equal dimensions through the dipping, drying and baking arrangement shown in Figure 3. The tapes are separately passed through a dip tank container 37 containing 27 to 60 percent solids of polytetrafluoroethylene and then through the low temperature drying zone A of oven 38 maintained between 150° C. and 250° C. and finally through baking zone B of oven 39 maintained at 250° C. to 320° C. The resulting composite structure comprises (a) a fused base of 0.002" in thickness and (b) an outer layer of non-fused polytetrafluoroethylene at a thickness of 0.00025" to 0.001" depending upon the solids content of the dispersion used in the dip tank container 37.

Both the cast and skived tape based composite films have applied as narrow tapes over conducting wires and fused to a higher degree of water-impermeability than equivalent tapes without the non-fused coatings.

*Example IV*

Typical of the applicability of this invention to new and useful composite structures is that produced according to Example III in which the dip tank container 37 contains a 37 percent solids of aqueous polytetrafluoroethylene dispersion with a 6 percent "Triton" x-100 wetting agent and a 0.125 percent of Monastral Green as a pigment. The resulting composite film emerging from the baking zone B of oven 39 assumes a light or pastel green color which provides a means for identifying the composite film. When further fused as a wrapping over a conductor such as AWG #22 7 strand silvered copper wire, the resulting insulation assumes a brilliant green color. Similar pigmenting effects have been achieved using Titanium Dioxide, Carbon Black, Cadmolith Yellow and other pigments suitably admixed with aqueous dispersion of polytetrafluoroethylene.

The above examples for producing the composite films of this invention are illustrative of the manner in which they may be produced under conditions hitherto not foreseen as capable of producing an intact, non-flaking structure. For the outer coating, the aqueous dispersion of polytetrafluoroethylene as described in Industrial and Engineering Chemistry, vol. 44, pages 1800–1805 (1952) is particularly suited for this invention since it contains the polymer in the form that can be readily handled by dipping operations. The particular dispersion employed in the above examples is known commercially as "Teflon" tetrafluoroethylene resin dispersion 30. This product nominally contains 6 percent "Triton" x–100 as a stabilizing and dispersing agent; this amount is usually sufficient for the applications described herein, but may be further modified by additional amounts of "Triton" x–100 or other dispersing agents, particularly those having some degree of volatility at 250° C. to 300° C.

The intent of this invention is not necessarily restricted to this commercial dispersion as other comminuted forms of equivalent fineness and stability can be used. In addition to substrates of fused "Teflon," prepared either by casting according to my said co-pending application or by skiving from molded billets, or by paste extrusion from "Teflon" 6, a commercial polytetrafluoroethylene resin, such fused substrates as modified by fillers or fibres of glass, asbestos and other inorganic materials can be used with equivalent effect of the outer layer for wrap insulation.

Where polytetrafluoroethylene is specified herein, it will be understood and evident that copolymers of tetrafluoroethylene together with other copolymerizable monomers are equally applicable.

The foregoing is illustrative of preferred forms of this invention and it will be understood that these preferred forms may be modified and other forms may be provided within the broad spirit of the invention and the broad scope of the claim.

I claim:

A process for making a composite polytetrafluoroethylene film structure having at least one exposed surface adapted to be bonded by fusion to such objects as metal conductors of electric current, comprising the steps of coating a stainless steel base supporting a fused substrate of polytetrafluoroethylene of measured thickness from 0.00025" to 0.005" by coating said substrate with an aqueous dispersion of polytetrafluoroethylene, drying said dispersion to remove all contained water to effect a film of non-fused polytetrafluoroethylene of 0.00025" to 0.005" thickness baking said dry film at temperatures not exceeding 327° C. and stripping the resultant composite film comprising a layer of fused polytetrafluoroethylene superimposed by a layer of non-fused polytetrafluoroethylene from the stainless steel base.

References Cited in the file of this patent

UNITED STATES PATENTS

| | | |
|---|---|---|
| 2,346,765 | Kratz | Apr. 18, 1944 |
| 2,520,173 | Sanders | Aug. 29, 1950 |
| 2,540,962 | Puppolo | Feb. 6, 1951 |
| 2,689,805 | Croze et al. | Sept. 21, 1954 |
| 2,705,691 | Panagrossi et al. | Apr. 5, 1955 |
| 2,710,266 | Hochberg | June 7, 1955 |
| 2,718,452 | Lontz | Sept. 20, 1955 |
| 2,728,698 | Rudner | Dec. 27, 1955 |
| 2,764,506 | Piccard | Sept. 25, 1956 |
| 2,773,781 | Rodman | Dec. 11, 1956 |
| 2,834,993 | Dipner | May 20, 1958 |